United States Patent
Denham (10) Patent No.: US 10,979,214 B2
(45) Date of Patent: Apr. 13, 2021

(54) SECURE HASH ALGORITHM IMPLEMENTATION

(71) Applicant: Martin Spence Denham, Bend, OR (US)

(72) Inventor: Martin Spence Denham, Bend, OR (US)

( * ) Notice: Subject to any disclaimer, the term of this patent is extended or adjusted under 35 U.S.C. 154(b) by 20 days.

(21) Appl. No.: 16/520,996

(22) Filed: Jul. 24, 2019

(65) Prior Publication Data

US 2020/0036517 A1  Jan. 30, 2020

Related U.S. Application Data

(60) Provisional application No. 62/702,353, filed on Jul. 24, 2018.

(51) Int. Cl.
*H04L 9/06* (2006.01)
*G06F 5/06* (2006.01)

(52) U.S. Cl.
CPC ............. *H04L 9/0643* (2013.01); *G06F 5/06* (2013.01)

(58) Field of Classification Search
CPC ................................ H04L 9/0643; G06F 5/06
USPC .......................................................... 380/28
See application file for complete search history.

(56) References Cited

U.S. PATENT DOCUMENTS

| | | | | |
|---|---|---|---|---|
| 7,818,563 | B1 * | 10/2010 | Dwork | H04L 63/0485 713/151 |
| 2017/0134163 | A1 * | 5/2017 | Suresh | H04L 9/3239 |
| 2017/0302440 | A1 * | 10/2017 | Agrawal | H04L 9/3239 |
| 2018/0089642 | A1 * | 3/2018 | Suresh | G06Q 20/0658 |
| 2018/0097615 | A1 * | 4/2018 | Suresh | H04L 9/0643 |
| 2020/0036517 | A1 * | 1/2020 | Denham | H04L 9/3239 |

OTHER PUBLICATIONS

FIPS PUB 180-4 Secure Hash Standard, Aug. 2015, National Institute of Standards and Technology (Year: 2015).*

* cited by examiner

*Primary Examiner* — Kambiz Zand
*Assistant Examiner* — Phuc Pham (57) ABSTRACT

A Secure Hash Algorithm 256 (SHA-256) expander operates over multiple cycles to convert 16 message words, M(t), into 64 working values, W(t), for input into a SHA-256 compressor. As the expander operates to produce W(t), it computes partial values of W(t) as soon as the necessary data operands are available in cycle time. Once computed, the partial values are retained and shifted and any unneeded original shift source values are discarded. When the shift register outputs finally arrive at the output, W(t) is already computed. The expander allows for one-write-port, one-read-port register files to be used in some integrated circuit embodiments. The expander also leads to improvements in adder delays, energy consumption, and area consumption when implemented as an integrated circuit.

5 Claims, 6 Drawing Sheets

> For $i=1$ to $N$:
> {
>   1. Prepare the message schedule, $\{W_t\}$:
>
>   $$W_t = \begin{cases} M_t^{(i)} & 0 \leq t \leq 15 \\ \sigma_1^{\{256\}}(W_{t-2}) + W_{t-7} + \sigma_0^{\{256\}}(W_{t-15}) + W_{t-16} & 16 \leq t \leq 63 \end{cases}$$
>
>   2. Initialize the eight working variables, $a$, $b$, $c$, $d$, $e$, $f$, $g$, and $h$, with the $(i-1)^{st}$ hash value:
>
>   $a = H_0^{(i-1)}$
>   $b = H_1^{(i-1)}$
>   $c = H_2^{(i-1)}$
>   $d = H_3^{(i-1)}$
>   $e = H_4^{(i-1)}$
>   $f = H_5^{(i-1)}$
>   $g = H_6^{(i-1)}$
>   $h = H_7^{(i-1)}$

-- *Reference Specification* --

Figure 5

-- Reference Specification --

3. For $t=0$ to 63:
   {
   $$T_1 = h + \sum\nolimits_{1}^{\{256\}}(e) + Ch(e,f,g) + K_t^{\{256\}} + W_t$$
   $$T_2 = \sum\nolimits_{0}^{\{256\}}(a) + Maj(a,b,c)$$
   $$h = g$$
   $$g = f$$
   $$f = e$$
   $$e = d + T_1$$
   $$d = c$$
   $$c = b$$
   $$b = a$$
   $$a = T_1 + T_2$$
   }

4. Compute the $i^{th}$ intermediate hash value $H^{(i)}$:
   $$H_0^{(i)} = a + H_0^{(i-1)}$$
   $$H_1^{(i)} = b + H_1^{(i-1)}$$
   $$H_2^{(i)} = c + H_2^{(i-1)}$$
   $$H_3^{(i)} = d + H_3^{(i-1)}$$
   $$H_4^{(i)} = e + H_4^{(i-1)}$$
   $$H_5^{(i)} = f + H_5^{(i-1)}$$
   $$H_6^{(i)} = g + H_6^{(i-1)}$$
   $$H_7^{(i)} = h + H_7^{(i-1)}$$
}

*Figure 6*
-- Prior Art --

SECURE HASH ALGORITHM IMPLEMENTATION

CROSS REFERENCE TO RELATED APPLICATION

This application claims the benefit of provisional patent application, No. 62/702,353, filed Jul. 24, 2018, title "Improvements to Secure Hash Algorithm Implementation", which is hereby incorporated by reference.

TECHNICAL FIELD

The technical field relates to the field of Integrated Circuits ("ICs") and also to the field of Hashing Circuits, and in particular to the circuit implementation of Secure Hash Algorithms.

BACKGROUND

Secure hashing is a technology that has been used for many years to verify the authenticity of a message. It is part of the overall world of cryptography. The invention pertains to Secure Hashing Algorithm per the SHA specification "FIPS 180-4, Secure Hashing Standard", dated August 2015, hereafter referred to as the Reference Specification. Per the Reference Specification, secure hashing involves the transform of a message (up to $2^{64}$ bits) into a single value (perhaps 256 bits) that has the following two properties: First, the final hash value (also called a digest) is highly entropic and second, it is virtually impossible to reverse. A reverse cryptographic attack would involve repeatedly hashing random messages until a matching hash is discovered—this is compute and time intensive, and in terms of a cryptographic attack, cannot conclusively discover the original message, since the original message is usually larger than the final digest size (i.e. many to one).

There are standards for secure hash algorithms (SHA's) and most notable are the SHA-1, SHA-224, SHA-256 which are defined in and published by NIST in the Reference Specification.

In recent years, SHA-256 hash has become popular and well-known as the preeminent hashing method used for cryptocurrency, the most popular being Bitcoin (defined by Satoshi Nokomura). SHA-256 is used as a key process component of a concept called Proof of Work. In Proof of Work, a plurality of finance transactions are hashed with SHA-256, in a logical construct called a "Merkle Tree". The top-most 256-bit result of this hash (called a "Merkle Root") is then coupled with other fields to form a logical header. The header contains the Merkle Root and the final SHA-256 hash of a previous header, along with some other critical fields. In Proof of Work, a candidate final header is repeatedly hashed while altering one of the fields, referred to as a "nonce", until a required threshold is achieved in the hash digest which can be approximated by a number of leading zeros. The exact details are well known to those skilled in the art of Bitcoin hashing.

The Proof of Work hashing of a block header can take a very large number of trial hashes, looking for a qualifying result related to the leading number of zeros. For example, every 10 minutes at the time of this patent description, in terms of Bitcoin Proof of Work, the number of hashes worldwide, looking for a qualifying result can be in the range of 10 to the 22 power.

When computer circuits and Application Specific Integrated Circuits (ASICs) perform a Proof of Work exercise, it is called "mining". When a process, circuit, or ASIC is mining, energy consumption (power consumption), speed, and latency are extremely important because they directly impact profitability of the effort. More to the point, profitability is dictated by receiving higher compensation for mining than the cost of materials and electricity to perform the mining. After an initial period of time to recover the hardware manufacture cost, the principle cost of mining is electricity.

More recently, this Proof of Work task has been shifted to ASICs which can perform the SHA-256 (or other) hash functions at higher speeds and lower energy (power) than other compute methods such as Central Processing Units (CPUs) and Graphics Processing Units (GPUs). CPUs are a general form of computers, including laptops, servers, and tablet devices.

In order to improve the profitability of mining, an entity must reduce the cost of electricity, either through reduced electricity costs to an electricity provider or through reduced power consumptions of the circuits which perform the mining. The use of a plurality of ASICs to perform Proof of Work has reduced the consumption of electricity for entities that do mining. However, competitive pressure from a world-wide aggregation of entities that do mining, places a burden of reducing ASIC power consumption still further in order to be profitable.

Throughout this document, energy and power can be used alternatingly with an understood and well-defined relationship between them. The most precise method of description a data conversion function (like SHA256) is energy, and usually, this is expressed in Joules and sometimes Pico-Joules or Fempto-Joules. One Pico-Joule is $1\times10^{-12}$ Joules. One Fempto-Joule is $1\times10^{-15}$ Joules.

The energy of a secure hash can be expressed in Joules per iteration. (An iteration is one time through an expansion and compression step, and a hash of a message can take multiple iterations).

Hash rate can be expressed as hashes per second, but more commonly is specified in Giga-Hashes per Second [GH/s] and sometimes Peta-Hashes per Second [PH/s]. In worldwide Bitcoin speak, the energy per hash actually refers to the energy per Bitcoin-double-hash.

The dynamic power of a hash function or hash circuit is calculated as follows:

$$\text{Hash Power}=\text{Hash Rate}*\text{Energy Per Hash}$$

So, for example, consider this circuit: a hash core performs hashes at a rate of 15 MH/s with average conversion energy of 150 Pico-Joules Per Hash. The dynamic power is Hash Core Dynamic Power=$(15\times10^6 \text{ H/s})*(150\times10^{-12} \text{ Joules/H})=2.25\times10^{-3}$ watts, and most often would be stated as "2.25 milliwatts" (again engineering notation).

The NIST SHA functions, regardless of exact bit-size, are divided into 2 steps: expansion and compression. (These are somewhat colloquial terms, but well understood in the industry). An example, which will be used extensively in this document, is SHA-256.

One iteration of a hash involves one expansion and one compression. In a SHA-256 hash, one iteration involves a 64 cycle-expansion and a 64-cycle compression.

In a Bitcoin double-hash, there are in fact three (3) total iterations. The first hashing function requires two iterations of hash because the Bitcoin header is 80 bytes, which is larger than what a single SHA-256 hash iteration can input. Thus, the first round of hash of a Bitcoin header involves two hash iterations. The final (second) hash only requires one hash iteration since the input message is the 256-bit value of the first hash which is smaller than the maximum hash size per iteration. To those skilled in the art, the result of the first hash, first iteration is often referred to as the "midstate hash" or "midstate digest".

The invention is a circuit that improves (lowers) the energy consumed by a SHA-256 expansion and hereafter in this description will be referred to as an expander; and, the key aspects of the invention that achieve advantages are broadly applicable to all SHA expanders as described in the referenced NIST standard, and thus the claims of the invention will also broadly apply to all SHA expansion functions. Such SHA algorithms include specifically: SHA-1, SHA-224, SHA-256, SHA-384, SHA-512, SHA-512/224 and SHA-512/256.

Figure 4:
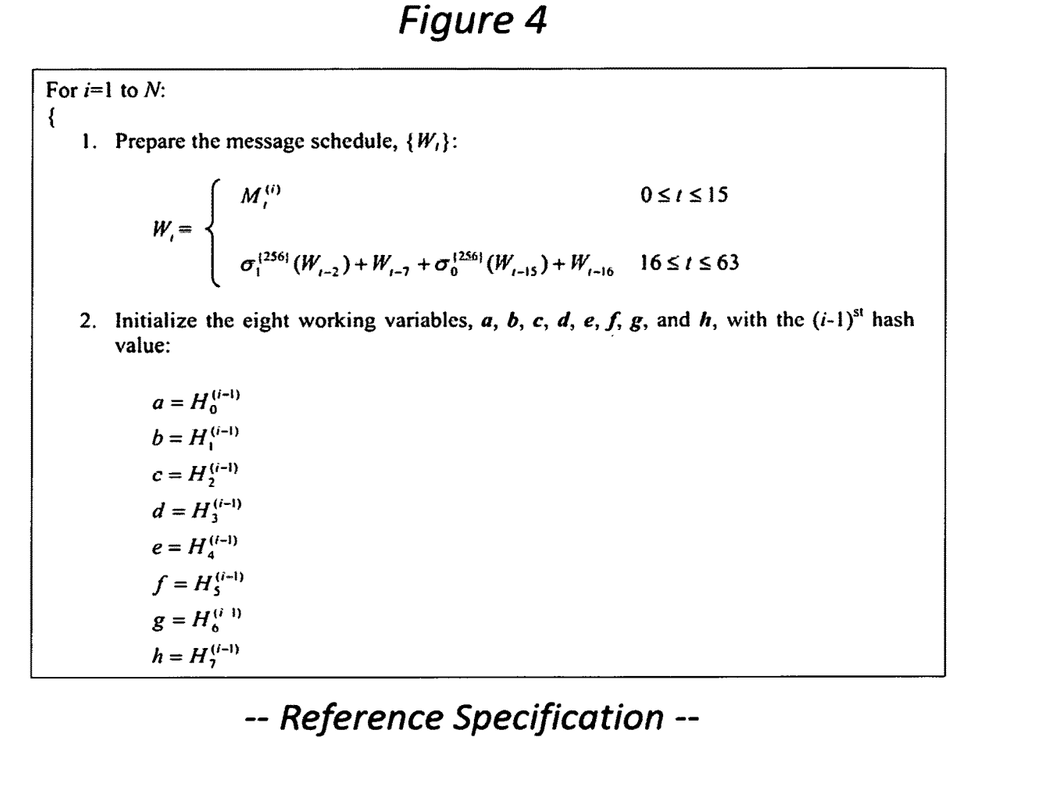
FIG. 4 is a screen capture from the Reference Specification, detailing the first two (2) steps of a SHA-256 hash operation, including Step 1 which describes the expansion operation.
Figure 5:
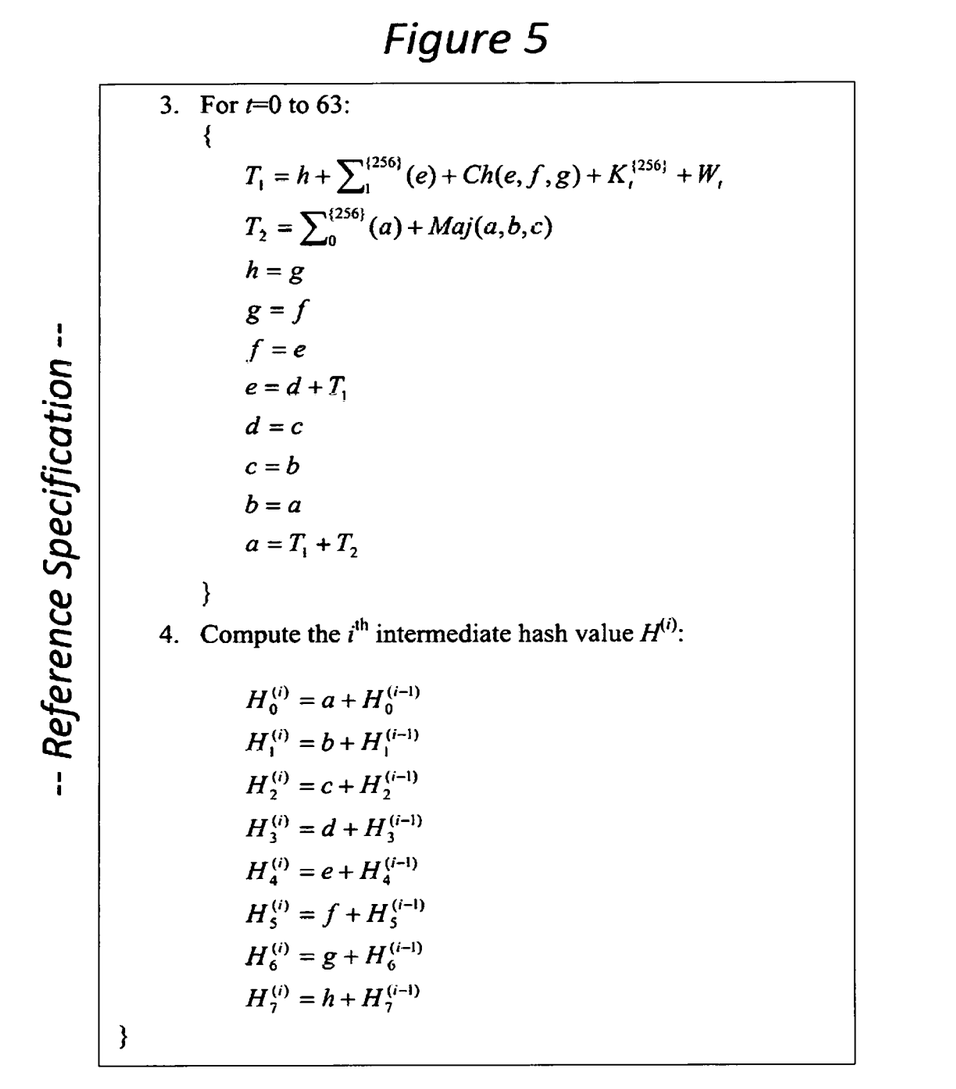
FIG. 5 is a screen capture from the Reference Specification, detailing the third and fourth steps of the SHA-256 hash algorithm.
Figure 6:
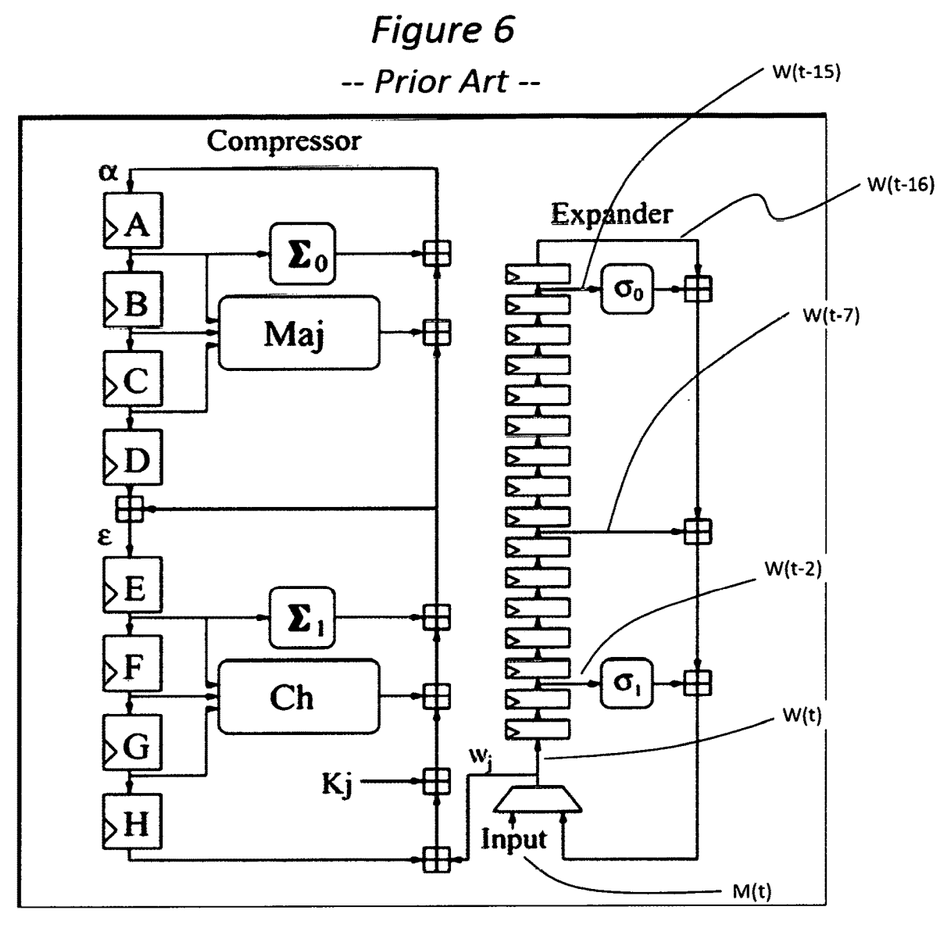
FIG. 6 is a screen capture of a publicly available graphical representation of the SHA-256 specification.

FIG. 4 is screen capture of the NIST FIPS 180-4 documentation page that describes the first two steps of the SHA-256 hash function for one iteration of hash. FIG. 5 is a screen capture of the third and fourth steps of SHA-256 for one iteration of hash. FIG. 6 is a public domain graphical representation of the SHA-256 specification as described in the specification.

In Step 1 of FIG. 4, the expansion (a.k.a. expander) function is described. The input to the expansion function is a width-normalized (padded) message, referred to as M(t) which comprises 16×32-bit words. The superfix notation (i) in FIG. 4 and FIG. 5 is a reference to the outer loop of message values that are being hashed—that is, the iteration index. The inner reference (t) references the inner cycle times (a.k.a. cycles) of the core function of a hash. For the first 16 state times "(0<=t<=15)", each of the 32-bit words is entered into the expander.

The output of the expander is a series of 32-bit words, described and represented as W(t). For the first 16 state times, the output W(t) is equal to the input message M(t). For the remaining 48 state times, the output W(t) is equal to the lower portion of the equation shown in FIG. 4, Step 1. In the equation, there are shorthand notations, for example "sigma1{256}". These functions are described in the specification and are well known to those skilled in the art. Furthermore, their exact definitions are not necessary to describe the invention. Thus, W(t) is a 64-word output, each word 32 bits, and the words output one at a time, over a total of 64 cycles.

Considering FIG. 4, Step 1. In the equation for the latter 48 cycle times, the delays of 32-bit values, $W_{t-2}$, $W_{t-7}$, $W_{t-15}$, and $W_{t-16}$, represent discrete time intervals (discrete cycles), specifically synchronous delays of the current value of W ($W_t$). Such delays can be created by a shift register, and the predominance of prior art solutions use shift registers or a variation thereof.

A natural temptation, in software, firmware, or circuits (notably ASICs) is to implement the function of FIG. 4, Step 1, exactly as it is specified. On ASICs, this can consume notable energy (per hash iteration). Prior art implementations have sought to improve the efficiency of the expansion function shown in FIG. 4, Step 1, but have not changed the computation order, nor have they changed the fundamental shift sequence described in FIG. 4, Step 1, nor have they sought to alter the values flowing through the shift register which delays M(t) or cycles the values of W(t) per the latter 48 cycles.

Design of prior art expanders for SHA-256 have evaluated the possibility of using register files to implement portions of the expander shift function. If the equation is implemented literally (as shown), a 4 read port register file/memory could be arranged to support FIG. 4, Step 1, exactly as it is specified. Unfortunately, experience has shown that such a memory is usually worse than a traditional shift-register when actually created in schematic and layout forms, and thus prior art ASIC circuits have usually avoided this potential solution to energy and area improvement. Notably, the 4-read-ports required of a register file to exactly implement the SHA-256 expander shift delays tends to consume large area and power.

A second problem of expansion as shown in FIG. 4, Step 1 and FIG. 6 "Expander" involves the 3 adders in series. Such a configuration increases wasted dynamic power, especially in SHA circuits (due to higher entropy of bit transitions). The carry chains of the adders can convey false paths which get compounded as the 3-level adder progresses. False transitions in these series of adders can create high "activity factors", a term well-understood in by those skilled in the art. High activity factors can increase wasted energy consumption.

It needs to also be noted that per FIG. 4, Step 1, after cycle 15, each word W(t) is computed by "looking backwards in time" at the shift register values (that is, words or values that have been computed earlier and circulated through the shift register), and then calculates a current W(t) by a combination of adds and other functions to produce the next state.

In many of these prior art designs, these problems create the need for complex architectural solutions, different approaches at "rolling", "unrolling", and so forth—basically mixes of work per clock cycle and computational ordering and pipelining. Unrolling (more work per clock cycle) can increase dynamic energy due to more adders in series with high activity factors. Tight rolling (pipelining) can create addition energy consumption in the clock trees and registers.

Thus, prior art circuits which create the sequence of output words W(t), based in input words M(t), focus on attempting to improve the efficiency of the basic construct of the Reference Specification, and they do not reorder the sequence or change the nature of the words that are shifted through a shift register. Since, after cycle 15, each word W(t) is computed by "looking backwards in time", prior art ASIC circuits preserve the exact nature of the specification and do not change the order of values in the shift register, nor do they change the contents of the shift register (relative to the Reference Specification).

When looking "backwards in time", prior art realizes the expander function by creating circuits to implement FIG. 4, Step 1, and in particular by implementing FIG. 4, Step 1, Cycles 16 to 63, implementing the equation 'Sigma1{256}[W(t−2)]+W(t−7)+Sigma0{256}[W(t−15)]+W(t−16)'. In the equation, "backwards in time" refers to fetching the delayed terms W(t−2), W(t−7), W(t−15), and W(t−16). In a standard prior art configuration, these terms are created via a shift register (See right hand side of FIG. 6). Thus, for each output value W(t), the equation must fetch four (4) 32-bit operands (W(t−2), W(t−7), W(t−15), and W(t−16)). The (t−x) represents delay where 'x' is the number of cycles of delay of the raw data term at the beginning of the shift register sequence.

The problem with prior art is that fetching four (4) 32-bit operands requires physical metal wires to convey the data from the shift register intermediate outputs out to the logic that performs the computation functions. Prior art has focused principally on improving the efficiency of this fetch or on the placement of the circuit elements, but it has not altered the equation order or materially altered the shift sequence.

As will be seen in this description, the invention changes the order of operations and the contents of the shift registers to create improvements in efficiency and energy consumption. The invention also provides an opportunity to use register files without the need for multi-read-port access, and in some physical embodiments, this could create additional advantages.

BRIEF SUMMARY

In one exemplary embodiment, a circuit computes the values of the SHA-256 expander output W(t) from padded input message M(t). The invention is a novel circuit arrangement that modifies the cycle order the SHA-256 expansion computation and shifting. More specifically, whereas the referenced NIST specification and prior art circuits "look backward" in time to grab shifted arguments, the invention computes partial values of W(t) at the earliest possible cycle time and then promotes those partial values "forward in time". When the final W(t) values emerge from the conceptual shift function, there is no need to look "backward in time" at prior shifted values because the computations are already completed. A key advantage of "forward in time" computation and the promotion of partial (intermediate) computation results is that the invention reduces or eliminates wires that prior art used to reach "backward" in time through the shift register to "grab" shifted values for computation. Such physical wires (implemented as metal layer routes on an ASIC) consume both area and power. Wires themselves consume area, and the wire capacitance draws switching power. In practical evaluations on one CMOS technology node, the invention achieved a 15% power reduction.

In the same exemplary embodiment, the invention also computes intermediate values with inherently pipelined capability (innate to the invention), and thus improves performance and speed of the computations relative to a given clock frequency of operation. More specifically, the invention "spreads out" the add operations over multiple cycles to prevent combining all the adds in one step as indicated by the Reference Specification. The invention spreads out the adds without incurring any pipeline delay penalty (in terms of cycles).

In the same exemplary embodiment, the invention also creates opportunity to use shift register constructs other than simple state elements (i.e. flipflops). The invention can make use of First-In-First-Out (FIFO) memories, for example. In some embodiments, FIFO memories could be realized with register files or SRAMs and supplemental control logic.

Furthermore, in the implementation of these FIFO memories, register files could be used, and the invention creates an advantage that single-read-port register files can be used, and this again can contribute to advantages. (Prior art methods would have required multi-read-port register files.)

Thus, the invention can achieve improvements in area, speed, and power.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 3(*a*) is a drawing of a trivial embodiment of Delay8 FIFO circuit.

FIG. 3(*b*) is a drawing of a trivial embodiment of Delay5 FIFO circuit.

DETAILED DESCRIPTION

Figure 1:
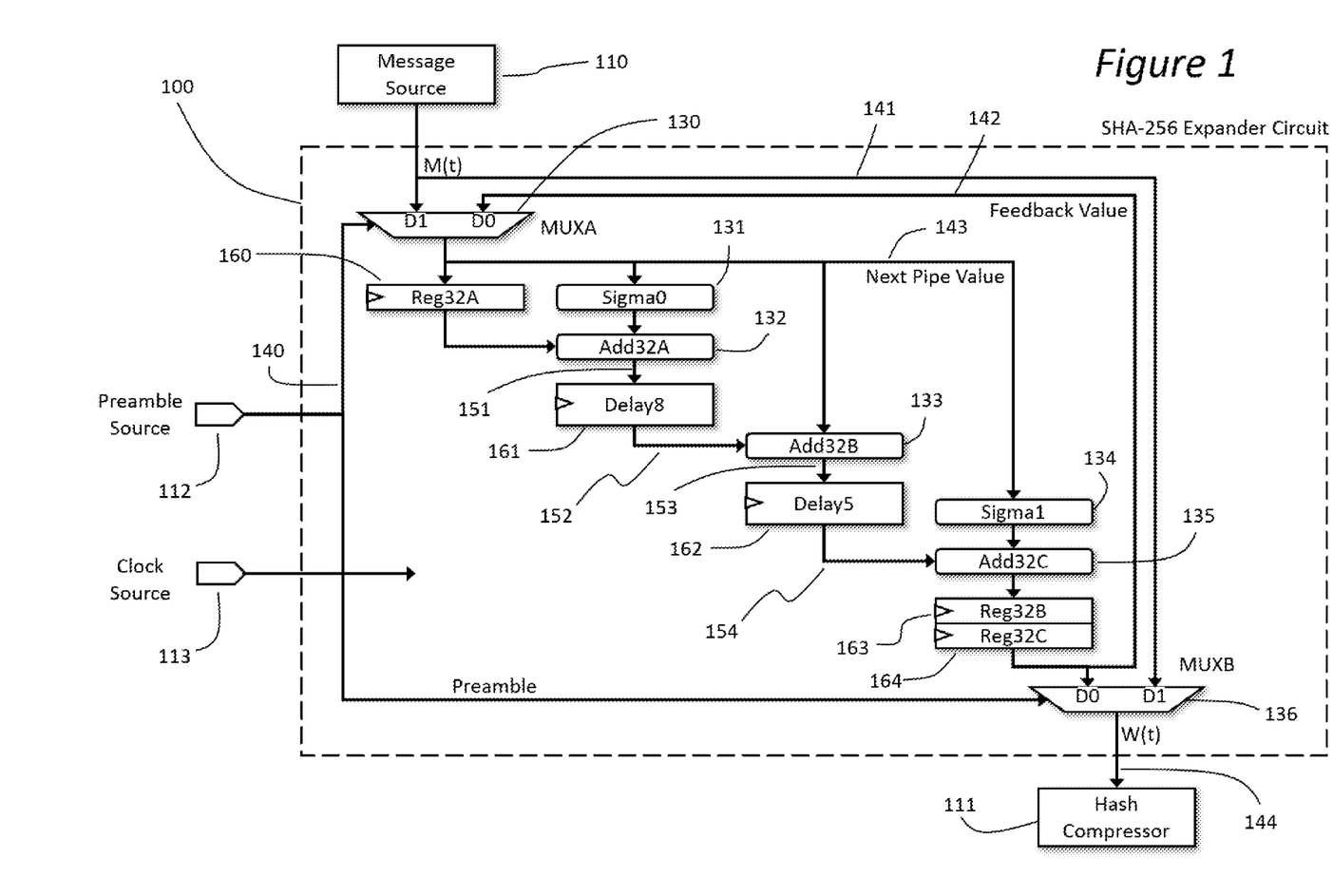
FIG. 1 is a block diagram of the SHA-256 Expander Circuit according to one exemplary embodiment.

Referring to the Figures and notably FIG. 1, SHA-256 Expander Circuit 100 is shown and described herein. Also note that all blocks are numerated, and some critical nets or buses are numerated, but some nets are not numerated when their connections are trivial. The behaviour of some critical nets is given in FIG. 2.

Figure 2:
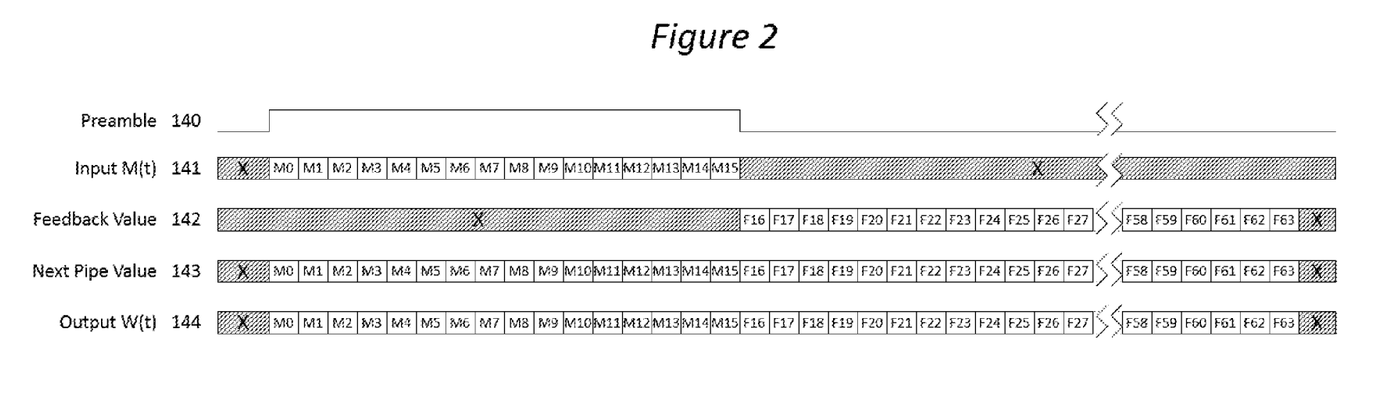
FIG. 2 contains illustrative timing diagrams for key nets and buses in FIG. 1.

SHA-256 Expander Circuit 100 receives a sequence of sixteen (16) thirty-two-bit (32-bit) messages from Message Source 110 over the first 16 cycles of an SHA-256 expansion operation. Message Source 110 couples to SHA-256 Expander Circuit 100 with a 32-bit bus M(t) 141. In cycle time 0, M(t) 141 conveys M(0); in cycle time 1, M(t) 141 conveys M(1), and so forth until and through cycle time 15, where M(t) 141 conveys M(15), each of these 32-bit values in accordance to the Reference Specification. In FIG. 2, these 16×32-bit messages (or "words") on M(t) 141 are illustrated. (Note that an exact implementation of the invention might have alterations of timing or pipelining and as such do not obviate the invention or the associated claims herein.)

SHA-256 Expander Circuit 100 computes a sequence of 64×32-bit words and outputs those 64 words to Hash Compressor 111. SHA-256 Expander Circuit 100 couples to Hash Compressor 111 via 32-bit bus W(t) 144. In cycle time 0, W(t) 144 conveys W(0); in cycle time 1, W(t) 144 conveys W(1), and so forth up through cycle time 63, where W(t) 144 conveys 32-bit value W(63), all according to the Reference Specification. Again, see FIG. 2 for illustration of the behaviour of W(t) 144. Since the first 16 32-bit words of W(t) 144 are the input M(t) 141, the values of W(t) 144 are shown as {M0, M1, M2, . . . M15}. In the remaining 48 cycles of the Expansion, W(t) 144 assumes the values of the Feedback Value 142, and those values are represented by {F16, F17, F18, . . . , F63}. (Also note that changes in timing or pipelining do not obviate the core aspects of the invention or the claims herein. Also note specifically, that in some embodiments, the SHA-256 K values (K(0) through K(63)) could be opportunistically combined with W(t) 144 to improve efficiency of words W(t) 144 going to Hash Compressor 111. Such alterations and efficiency improvements are not key aspects of the invention and thus do not obviate the claims of the invention herein.)

A Preamble Source 112 creates a one-bit wide signal that is in a first state for the first 16 cycles of operation and a second state for the remaining 48 cycles of operation. In a preferred embodiment, the first state is a logic '1' and the second state is a logic '0'. The first state corresponds to the 16 input of words from Message Source 110. Preamble Source 112 couples to Mux Select 140 which is a single-bit-wide wire that controls Multiplexor MUXA 130 and Multiplexor MUXB 136, and the essence of which will be described below. The behaviour of Preamble 140 is also shown in FIG. 2. The details of how Preamble Source 112 creates signal Preamble 140 is outside the scope of this invention and is not a key part of the invention.

Clock Source 113 is a synchronizing clock signal that represents any fundamental ASIC logic timing signal. It will be obvious to those skilled in the art that Clock Source 113 could represent a single positive-edge clock, a single negative-edge clock, a dual-edge clock, a pulse clock, multiple pulse clocks, phase delay or phase clocks, or any other type of synchronizing clock source available to an ASIC implementation. The exact type of clock is not a key part of the invention and any specific type of clock does not obviate the description of the invention or associated claims of the invention. For clarity of the drawings, the wire or wires that would connect Clock Source 113 to the sequential elements (Reg32 160, Delay8 161, Delay5 162, Reg32 163, and Reg32 164) are not shown. Furthermore, the exact nature of such connections is not a key aspect of the invention and specific implementations do not obviate the claims herein. The essential aspect of Clock Source 113 is that it creates the cycles over which the SHA-256 Expander Circuit 100 operates.

Not shown in conjunction with SHA-256 Expander Circuit 100 are any peripheral control circuits, stop or start circuits, input-output (IO) circuits, or any other circuits that would be associated with a SHA-256 expander circuit, and the details of such circuits is outside the scope of claims of the invention.

Likewise, also not shown in conjunction with SHA-256 Expander Circuit 100 are any circuit implementation details of Message Source 110, Hash Compressor 111, Preamble Source 112, or Clock Source 113. The exact construction of these circuits are not key parts of the invention and any implementation of these circuits does not obviate the description of the invention or associated claims of the invention.

Also not shown in FIG. 1 are the exact logical or gate representations of any of the circuits within SHA-256 Expander Circuit 100. The exact nature of these circuits is not essential to the ideas of the invention and any implementation of these circuits does not obviate the description of the invention or associated claims of the invention. Thus, the logic gate types (AND, OR, NAND, NOR) or the exact sequential circuits (Flip-Flop, Latches, Bit Cells), the exact type of process (CMOS, BiCMOS, etc.), the process node (180 nm, 130 nm, ..., 22 nm, 14 nm, 7 nm, 5 nm, etc.), the type of logic (active high, active low, wire-AND, wire-OR), the exact physical arrangements or metal routing—none of these are essential ideas of the invention, and the manner in which one actually constructs the invention from gates or sequential elements does not obviate the description of the invention or associated claims of the invention.

In the exemplary embodiment of the invention, of SHA-256 Expander Circuit 100, there are fundamentally three sets of components: those that store logic data, those that manoeuvre data, and those that compute new values of data.

Reg32A 160, Reg32B 163, and Reg32C 164 are 32-bit wide storage elements that store a 32-bit word of data, consistent with the SHA-256 specification. Each of these 32-bit registers has a parallel 32-bit data input and a parallel 32-bit data output. Each clock cycle, these registers each receive a 32-bit data operand and promote that operand forward to their 32-bit data outputs. These elements not only store data values necessary for expansion, but also provide one cycle of delay of that same data. Also note that the traditional carrot symbol denotes that they receive some type of synchronizing clock source, consistent with ASIC and logic circuit timing and are well understood by those skilled in the art of circuit or logic design.

Reg32A 160 creates a one-cycle delay and corresponds to W(t–15) found in FIG. 4, Step 1. Reg32B 163 corresponds to W(t–1) and Reg32C 164 corresponds to W(t–0); neither of these are expressly stated in FIG. 4, Step 1, but their relevance is well understood to those skilled in the art of SHA-256 expander design.

The output of Reg32C 164 drives 32-bit bus Feedback Value 142 which is coupled to the "D0" input of Multiplexor MUXA 130 and the "D0" input of Multiplexor MUXB 136.

Also, within SHA-256 Expander Circuit 100 are Delay8 161 and Delay5 162. Delay8 161 stores 8×32-bit words, sequences those words in such a way as to create a First-In-First-Out (FIFO) sequence. In doing so, Delay8 161 realizes an 8-cycle delay for 32-bit words that are stored in it. Similarly, Delay5 162 stores 5×32-bit words, sequencing those words in such a way as to create a First-In-First-Out (FIFO) sequence. In doing so, Delay5 162 realizes a 5-cycle delay for 32-bit words that are stored in it. Delay8 161 has a 32-bit input 151 and a 32-bit output 152. Delay5 162 has a 32-bit input 153 and a 32-bit output 154. Each clock cycle, these registers each receive a 32-bit data operand. At a later cycle time, the same 32-bit data operand is faithfully reproduced at the 32-bit data output. Delay8 161 reproduces data on 32-bit input 151 on 32-bit output 152 8 cycle times after receiving it, and Delay5 162 reproduces data on 32-bit input 153 on 32-bit output 154 5 cycle times after receiving it.

The output of Delay8 161 is a 32-bit bus denoted 152 in FIG. 1 and corresponds to W(t–7) in the expander equation of Step 1 in FIG. 4, Step 1.

The output of Delay5 162 is a 32-bit bus denoted 154 in FIG. 1 and corresponds to W(t–2) in the expander equation of Step 1 in FIG. 4, Step 1.

Delay8 161 and Delay5 162 can be implemented in any fashion and the exact nature of their implementation does not obviate the description of the invention or the claims herein. Delay8 161 and Delay5 162 could be realized with memory components (SRAM cells), register file components, Flip-Flops, latches, along with associated controlling gates and buffer cells. In one embodiment, Delay8 161 and Delay5 162 could be realized with register file components and associated logic and thus reduce the amount of movement of data bits, possibly realizing a power improvement (reduction).

Figure 3A:
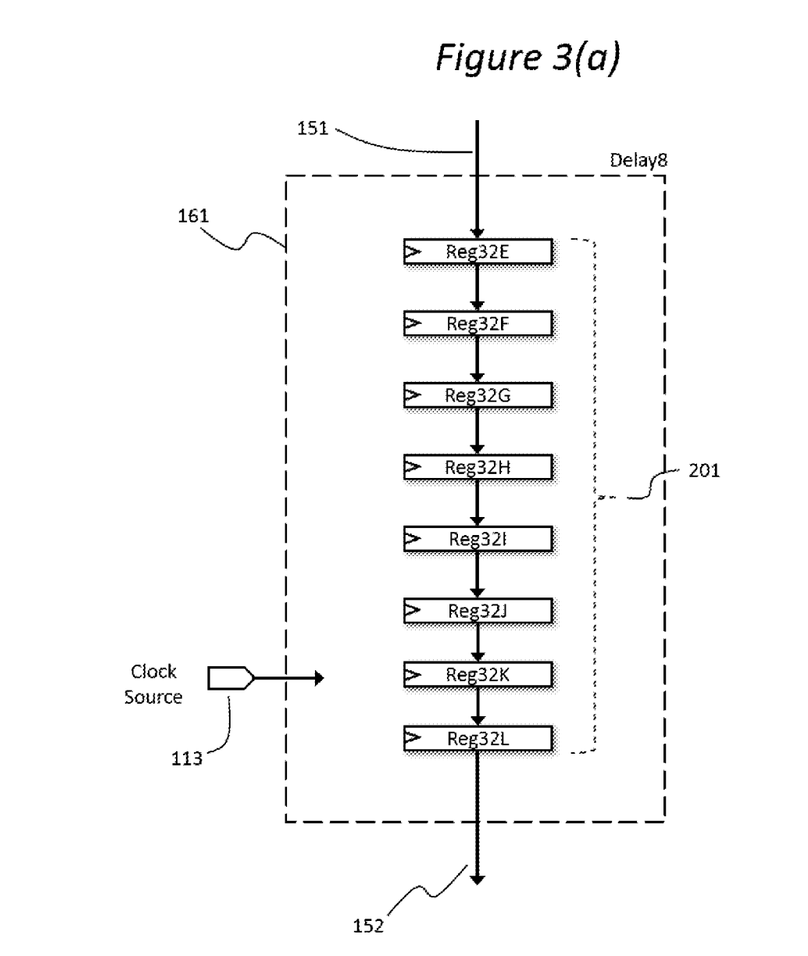

FIG. 3(a) shows a trivial embodiment for Delay8 161, shown as a flow-through path through eight (8) Reg32 sequential elements (Reg32E, Reg32F, Reg32G, Reg32H, Reg32I, Reg32J, Reg32K, and Reg32L), collectively annotated 201. Each of the 8 Reg32 sequential elements is 32 bits wide, per the Reference Specification. In this manner, this simplified embodiment of Delay8 161 can faithfully reproduce data on 32-bit input 151 at 32-bit output 152 eight (8) cycles later.

Figure 3B:
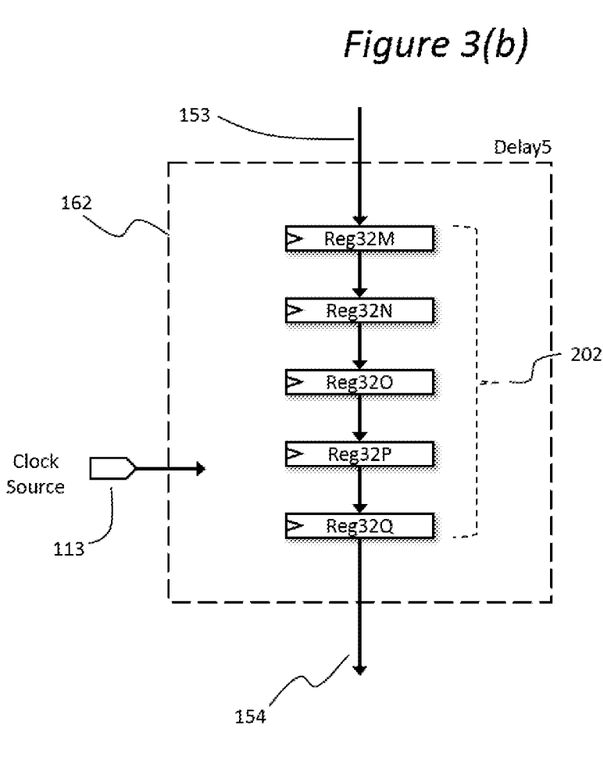

FIG. 3(b) shows a trivial embodiment for Delay5 162, shown as a flow-through path through five (5) Reg32 sequential elements (Reg32M, Reg32N, Reg32O, Reg32P, and Reg32Q), collectively annotated 202. Each of the five (5) Reg32 sequential elements is 32 bits wide, per the Reference Specification. In this manner, this simplified embodiment of Delay5 162 can faithfully reproduce data on 32-bit input 153 at 32-bit output 154 five (5) cycles later.

It will be obvious to those skilled in the art of logic design how FIG. 3(a) and FIG. 3(b) create eight (8) and five (5) cycles of delay. It will be obvious to those skilled in the art of logic design that several other circuit arrangements are possible to create the same logical behaviour, including but not limited to arrangements of flipflops, latches, register files, and SRAM configurations.

Thus, sequential elements Reg32A 160, Delay8 161, Delay5 162, Reg32B 163, and Reg32C 164 comprise the essential storage and delay elements of SHA-256 Expander Circuit 100, and they can be realized in any variety of circuit implementations without obviating the innate description the invention or claims herein.

Multiplexor MUXA 130 and Multiplexor MUXB 136 are two 2:1 multiplexors within SHA-256 Expander Circuit 100 and they manoeuvre data according to a one-bit-wide Preamble 140. Each of these multiplexors has two input operands and one output operand. Each input operand is 32 bits wide and each output operand is 32 bits wide.

For the first 16 cycle times, Multiplexor MUXA 130 conveys its 32-bit D1 input from M(t) 141 and promotes it faithfully to its 32-bit output Next Pipe Value 143, according to Preamble 140 being in a first logic state. For the remaining 48 cycle times of the expansion, Multiplexor MUXA 130 conveys its 32-bit D0 input from 32-bit wide net Feedback Value 142 and promotes it faithfully to its 32-bit output Next Pipe Value 143, according to a second logic state of Preamble 140.

Similarly, for the first 16 cycle times, Multiplexor MUXB 136 conveys its 32-bit D1 input from M(t) 141 and promotes it faithfully to its 32-bit output W(t) 144, according to Preamble 140 being in a first logic state. For the remaining 48 cycle times of the expansion, Multiplexor MUXB 130 conveys its 32-bit D0 input from 32-bit wide output of Reg32C 164 and promotes it faithfully to 32-bit wide W(t) 144 according to a second logic state of Preamble 140.

SHA-256 Expander Circuit 100 also contains a plurality of logic blocks, including Sigma0 131 and Sigma1 134. Sigma0 131 and Sigma1 134 both have a single 32-bit input and a single 32-bit output. The exact specifications of the logic functions are given in the Reference Specification. In addition, SHA-256 Expander Circuit 100 also comprises three 32-bit adders: Add32A 132, Add32B 133, and Add32C 135. Each of these adders executes a 32-bit unsigned binary addition between two 32-bit input operands and outputs a 32-bit unsigned binary value. Any overflow or underflow of Add32A 132, Add32B 133, and Add32C 135 is discarded, per the Reference Specification. The exact order of the two 32-bit inputs of these adders is not relevant (i.e. A+B versus B+A) by the symmetric property of addition.

The combination of the storage elements, logic blocks, and multiplexors works to implement the equations of FIG. 4, Step 1. Furthermore, the storage elements and the logic blocks work to implement FIG. 4, Step 1, cycles 16 to 63. In the subsequent part of this description, the relevant equation description of cycles 16 to 63 is 'Sigma1{256}[W(t−2)]+W(t−7)+Sigma0{256}[W(t−15)]+W(t−16)'.

Sigma0 131 has as its input Next Pipe Value 143 and provides its output to an input of Add32A 132.

Add32A 132 adds the 32-bit output of Reg32A 160 to the 32-bit output of Sigma0 131, per the specification. The 32-bit output of Add32A 132 is coupled to the 32-bit input 151 of Delay8 161. In doing so, the invention realizes innovation and departure from prior art: the original operand contained in Reg32A 160 is discarded and not moved forward in the shift sequence (unlike the reference specification and unlike prior art). Instead of forwarding the contents of Reg32A as in prior art and per the Reference Specification, SHA-256 Expander Circuit 100 realizes a novel reordering of SHA-256 expansion equations. The partial future W(t) 144 value, 'Sigma0{256}[W(t−15)]+W(t−16)' is shifted into input 151 of Delay8 161 to be appropriately delayed by 8 cycles. This is referred to as a "feed forward" construct and is distinctly different from the "backward looking" access annotated in the referenced document and prior art (e.g. "W(t−15)" of FIG. 4, Step 1). In this manner, SHA-256 Expander Circuit 100 creates novel circuit constructs along with associated advantages.

Add32B 133 adds 32-bit bus value Next Pipe Value 143 to 32-bit Delay8 161 output 152 and feeds the resulting 32-bit sum to the 32-bit input 153 of Delay5 162. Thus, the invention has now created the aggregated computation of 'W(t−7)+Sigma0{256}[W(t−15)]+W(t−16)' and moved it forward into the shift sequence. Once again, the invention realizes innovation and departure from prior art: the shift-delayed operand from Delay8 161 is discarded and not moved forward in the shift sequence and instead, the further improved partial computation value of a W(t) 144 term is promoted forwarded in the shift sequence.

Sigma1 134 takes as its 32-bit input Next Pipe Value 143 and forwards its 32-bit output to an input of Add32C 135.

Add32C 135 takes as a 32-bit input the 32-bit output 154 of Delay5 162 and also a 32-bit input from the output of Sigma1 134.

The 32-bit output of Add32C 135 is coupled to the 32-bit input of Reg32B 163. In doing so, a final eventual value of a W(t) 144 value 'Sigma1{256}[W(t−2)]+W(t−7)+Sigma0{256}[W(t−15)]+W(t−16)' is completed and pending output to Hash Compressor 111 after being delayed by Reg32B 163 and Reg32C 164 to correctly meet the cycle times proscribed by the Reference Specification.

The description has illustrated a preferred embodiment of a SHA-256 Expander Circuit. Subtle details can be changed in implementation that do not obviate the novelty or claims of the invention. The key aspect of the invention is that values of W(t) 144 are partially computed in early cycles once they are computationally feasible and promoted forward. Furthermore, original data terms are discarded once they're used. In this manner, the invention reduces the need to "look backward" across the shift sequence using multiple wire buses (one for each data term). This creates advantages of fewer wires, less capacitance, less complexity, and the option to implement delays of 8 (Delay8 161 in the described embodiment) and delays of 5 (Delay5 162 in the described embodiment) with possibly more efficient memory structures.

The key elements and claims of the invention can also be used on the other SHA algorithms, specifically performing partial computations of W(t) when first computationally feasible promoting those partial terms forward and dropping original raw shifted values.

In addition to the advantages claimed, the SHA-256 Expander Circuit 100 can be modified in several ways to include K(t)+W(t) additions, prior to data arriving at output W(t) 144. This is standard pipelining technique, obvious to those skilled in the art of logic design. Any additional efficiency modifications (such as K(t)+W(t), etc.) do not obviate the claims or core aspects of the invention, described herein.

The invention claimed is:
1. A Secure Hash Algorithm expander circuit configured to perform expansion over multiple clock cycles to receive a sequence of hash input values M(t) and to generate a sequence of hash intermediate values W(t) in accordance with a description of hash expansion in a reference specification entitled "FIPS 180-4, Secure Hashing Standard" of August 2015, the expander circuit comprising:

a. an input bus configured to receive 32-bit values of M(t), one per clock cycle;

b. a first multiplexer having two 32-bit inputs and a 32-bit output, configured to pass values from the input bus to its output for an initial 16 clock cycles of an expansion and thereafter pass values from an internal 32-bit bus to its output, wherein its output contains the value of W(t) for each clock cycle;

c. a delay circuit having sequential elements, organized as 16 delay circuit register stages with each delay circuit register stage 32-bits wide, indexed ordinally from 1 to 16, having the input of its first delay circuit stage (stage 1) coupled to the output of the first multiplexer, and wherein the input of each subsequent delay circuit stage (n) is coupled to the output of the previous delay circuit stage (n-1), and also whereby values held in each stage of the delay circuit are copied to the next stage of the delay circuit unchanged;

d. a sigma0 logic circuit;

e. a sigma1 logic circuit;

the improvement comprising:

i. a first, a second, and a third adder circuits, each of said adder circuits having two 32-bit inputs and a 32-bit output, wherein the first adder circuit takes as its inputs the output of the sigma0 logic circuit and the output of the $1^{st}$ delay circuit stage, the second adder takes as its inputs the output of the first multiplexer and the output of the $9^{th}$ delay circuit stage, and the third adder takes as its inputs the output of the sigma1 logic circuit and the output of the $14^{th}$ delay circuit stage;

ii. the respective inputs of the sigma0 logic circuit and the sigma1 logic circuit are coupled to the output of the first multiplexer;

iii. the input of the $2^{nd}$ delay circuit stage is coupled to the output of the first adder, the input of the $10^{th}$ delay circuit stage is coupled to the output of the second adder, and the input of the $15^{th}$ delay circuit stage is coupled to the output of the third adder;

iv. the output of the $16^{th}$ delay circuit stage is coupled to the internal bus; and v. whereby in each clock cycle, intermediate incomplete values of W(t) created by the first, second, and third adders are shifted into the delay circuit at the $2^{nd}$, $10^{th}$, and $15^{th}$ delay circuit stages, respectively, wherein the first, second and third adders perform two-operand-only additions in distinctly separate clock cycles, and the output values of the $1^{st}$, $9^{th}$, and $14^{th}$ delay circuit stages are no longer retained.

2. The expander circuit of claim 1 wherein the $2^{nd}$ through $9^{th}$ delay circuit stages further comprise:

a. a one-input-port one-output-port SRAM configured to operate in a first-in first-out manner; and b. a sequential logic circuit configured to store input values into the SRAM circuit in a given clock cycle and retrieve those values to its output 8 clock cycles later.

3. The expander circuit of claim 1 wherein the $10^{th}$ through $14^{th}$ delay circuit stages further comprise:

a. a one-input-port one-output-port SRAM configured to operate in a first-in first-out manner; and b. a sequential logic circuit configured to store input values into the SRAM circuit in a given clock cycle and retrieve those values to its output 5 clock cycles later.

4. The expander circuit of claim 1 wherein the $2^{nd}$ through $9^{th}$ delay circuit stages further comprise:

a. a one-input-port one-output-port register file configured to operate in a first-in first-out manner; and b. a sequential logic circuit configured to store input values into the register file in a given clock cycle and retrieve those values to its output 8 clock cycles later.

5. The expander circuit of claim 1 wherein the $10^{th}$ through $14^{th}$ delay circuit stages further comprise:

a. a one-input-port one-output-port register file configured to operate in a first-in first-out manner; and b. a sequential logic circuit configured to store input values into the register file in a given clock cycle and retrieve those values to its output 5 clock cycles later.

* * * * *